Sept. 25, 1934.　　　R. ABELL　　　1,974,555

ENGINE DRIVE MECHANISM

Filed Jan. 24, 1931

Inventor:
Robin Abell.
by
Charles L. Gooding
Atty.

Patented Sept. 25, 1934

1,974,555

UNITED STATES PATENT OFFICE 1,974,555

ENGINE DRIVE MECHANISM

Rollin Abell, Milton, Mass.

Application January 24, 1931, Serial No. 511,014

30 Claims. (Cl. 74—9)

This invention relates to an engine drive mechanism, particularly adapted to transmit motion from a driving shaft to a driven shaft such, for example, as the driving shaft of a starting motor in an automobile and the fly-wheel and crank shaft of an internal combustion engine.

The engine drive mechanism of this invention embodies therein a radially operated cylindrical friction clutch, one member of which is fast to the starting motor shaft, or to an intermediate member or shaft driven from the starting motor shaft and the other member of which is a split sleeve surrounding the first-named clutch member and having frictional engagement therewith. The clutch drives a sleeve longitudinally of the starting motor shaft and also rotates it and this sliding sleeve is connected by a torsional spring to a pinion slidable on the starting motor shaft and rotatable therewith and constituting a driving member, so that by rotation of the starting motor shaft the pinion or driving member may be brought into engagement with a gear positioned on the fly-wheel of the engine and constituting a driven member and rotate said gear.

The object of the invention is to increase the life of the pinion and ring gear by preventing the chipping of the teeth of the ring gear or of the pinion during the interengagement of the teeth of the pinion with the teeth of the ring gear, and to reduce shock of starting engine, and to accomplish this object the engine drive mechanism of this invention embodies therein the combination of a torsion shock-absorbing spring and a friction clutch of a type having co-operating superposed cylindrical friction surfaces extending parallel to the axis thereof, the spring and the clutch being interposed between the driving member or pinion and the starting motor shaft and thus protecting the spring from breakage on overloads, such as, backfires, etc.

The invention consists in an engine drive mechanism of the character set forth in the following specification and particularly pointed out in the claims.

Referring to the drawing:—

Like numerals refer to like parts throughout the several views of the drawing.

Figure 1:
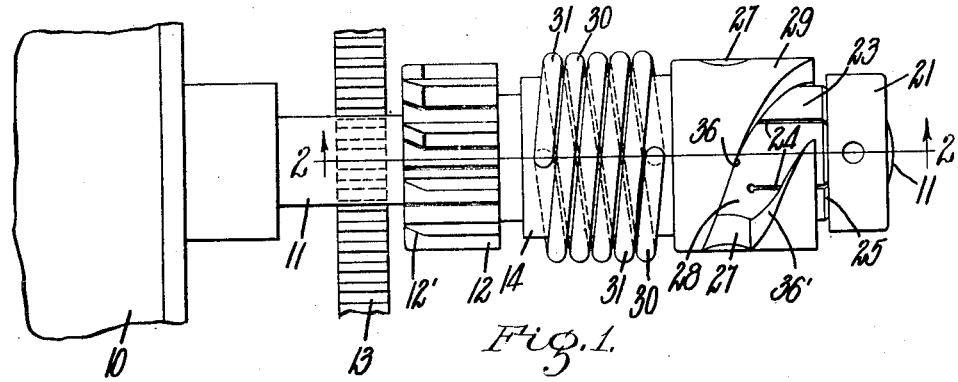
Fig. 1 is a side elevation of an engine drive mechanism embodying my invention, a portion of the same being broken away.

In the drawing, referring to Figs. 1 to 4 inclusive, 10 is a portion of a starting motor such as is used in automobiles for starting the rotation of the engine crank shaft, and well known to those skilled in this art, and 11 is the starting motor shaft. 12 is a driving pinion which is slidably mounted in relation to shaft 11 and is operated by the mechanism hereinafter described to be moved longitudinally of the shaft 11 into engagement with an annular gear 13 which is positioned upon a fly-wheel, not shown in the drawing. The pinion 12 has its teeth chamfered at 12' in order to assist in the interengagement of the pinion teeth with the gear teeth, and has a cylindrical hub 14. The pinion 12 is provided with a chamber 15 and has two shoulders 16 and 17 therein.

A spiral spring 18 encircles the starter shaft 11 and bears at one end against a shoulder 11' on said shaft and at the other end against the shoulder 17 in the pinion chamber 15. A clutch 19 having co-operating superposed cylindrical friction surfaces extending parallel to the axis thereof is mounted upon the outer end of the shaft 11 and comprises a clutch sleeve 20 which terminates at its outer end in a flange 21 and is fastened by a pin 22 to the shaft 11.

A split sleeve 23 surrounds the clutch sleeve 20 in frictional engagement therewith, the said sleeve being split by a plurality of slits 24 and being compressed on the slit end to a smaller normal diameter than the clutch sleeve 20 over which it is finally forced. This construction causes the desired initial friction between the sleeves 20 and 23 of the friction clutch 19.

The clutch 19 is designed to have a driving friction approximately equal to the torque of the motor.

The split sleeve 23 is tapered at its outer end at 25 and this tapered portion 25 engages a tapered surface 26 provided within the flange 21. Two oppositely disposed lateral projections 27 are provided upon the rear end of the split sleeve 23 and project into cam grooves 28 provided in the periphery of a sleeve 29 which is slidably mounted upon the starter shaft 11. Two torsional springs 30 and 31 surround the sleeve 29 and the flange 14 of the pinion 12, the coils of said springs being intermeshed one with another. The opposite ends of the springs 30 and 31 are turned inwardly at 32 and 33 and enter holes 34 and 35 provided in the flange of the pinion 14 and in the sleeve 29 respectively.

The general operation of the mechanism hereinbefore specifically described is as follows:—Assuming the starter mechanism to be operated in the usual manner, the starter shaft or drive shaft 11 is rotated. This imparts rotation to the clutch sleeve 20 and as the split sleeve 23 has frictional engagement with the sleeve 20, forming as a whole the clutch 19, the said clutch will be rotated with the laterally projecting studs 27 on the split sleeve 23. The studs engage the edge 36 of the cam 28 and drive the sleeve 29, springs 30 and 31 and pinion 12 longitudinally of the shaft 11 until the pinion 12 engages the annular gear 13 and the said studs 27 also impart a rotary movement to the sleeve 29, and through the torsional springs 30 and 31 a rotary movement is imparted to the pinion 12. When the pinion 12 engages the annular gear 13, if the teeth of the pinion and the gear abut, the teeth of the pinion will be pressed against the teeth of the gear and the torsional springs 30 and 31 will yield, thus providing a time lag in the rotation of the pinion and allowing the shaft 11 to continue its rotary motion while the teeth of the pinion have time to work their way into mesh with the teeth of the gear without chipping or breaking either the teeth of the pinion or of the gear.

If the resistance of the teeth on the pinion to rotation when said teeth first abut against the teeth of the gear is excessive, then the clutch 19 will slip, that is, the clutch sleeve 20 will slip inside the split sleeve 23 of said clutch and this will prevent chipping of the teeth in the pinion and gear and also will prevent breaking the torsional springs 30 and 31. The pinion thus has opportunity to move on the teeth of the gear until they come into alignment with the space between the gear teeth, thereupon the pinion will move forward until its teeth mesh with the gear teeth and when they are fully in mesh the shoulder 16 in the pinion 12 will abut against the shoulder 11' on the shaft 11 and at this time the drive through the torsional springs 30 and 31 and the clutch will begin a second time and at this second time the torsional springs will act and the clutch will slip until the inertia of the fly-wheel and engine is overcome, so that there are two possible points at which the clutch will slip, namely, when the teeth of the pinion first abut against the teeth of the gear, and second, after the teeth of the pinion have moved into mesh with the teeth of the gear. In any case, the torsional springs will act twice unless it happens that the pinion teeth align with the space between the teeth of the gears, whereupon no resistance to the forward movement of the pinion to bring it into mesh with the gear will be encountered.

It will be seen that resistance to the movement of the pinion when being caused to mesh with the gear will tend to force the tapered end 25 of the split sleeve 23 into the tapered recess 26 in the flange 21 of the sleeve 20, thus increasing the friction between the two sleeves of the clutch and forming a resistance or torque capacity substantially equal to the stall torque of the motor.

Figures 2, 3:
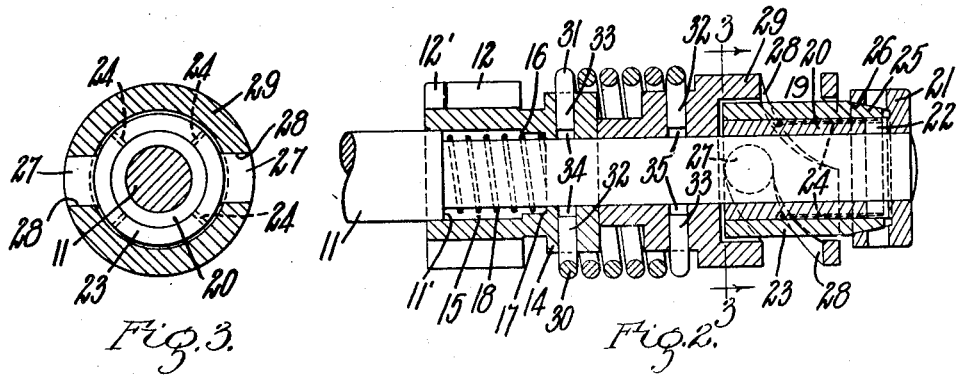
Fig. 2 is a sectional plan taken on the line 2—2, Fig. 1.
Fig. 3 is a transverse section taken on the line 3—3, Fig. 2.

When the gear 13 and its crank shaft are rotating, the starter is stopped in the usual manner and the pinion 12 will be moved out of engagement with the gear 13, due to the fact that the pinion 12 will then be rotated by the gear 13 and the studs 27 being stationary, the pinion 12 and the sleeve 29 will be forced toward the right, Figs. 1 and 2, by the engagement of the studs 27 with the side 36' of the cam 19.

It will be seen that the pinion 12 and the gear with which it meshes are rotated by the shaft 11 through the friction clutch 19 and through the torsional springs 30 and 31.

It is not necessary that there should be two torsional springs 30 and 31, but it is considered desirable and more efficient to have two comparatively light springs than to have one heavy torsional spring.

The clutch is so constructed and the friction between the two parts 20 and 23 thereof is of such an amount that one of these parts will slip on the other before the springs 30 and 31 are subjected to such a torsional strain that they will break.

In the drive mechanism of this invention a heavy bumper spring is not required on account of the soft action of the clutch and yielding action of the torsional springs, and the only spring required other than the springs 30 and 31, is a light anti-rattler spring 18 which prevents the pinion from jarring along the shaft and chattering along the fly-wheel, due to vibration.

It is obvious that the angle of the cam path 28 may be changed, and if it is reduced, the initial friction between the sleeves 20 and 23 of the clutch can be reduced. There are some applications of this clutch where it is desirable to reduce the angle of the cam to a point where a very slight friction is required to make it self-energizing.

Figure 5:
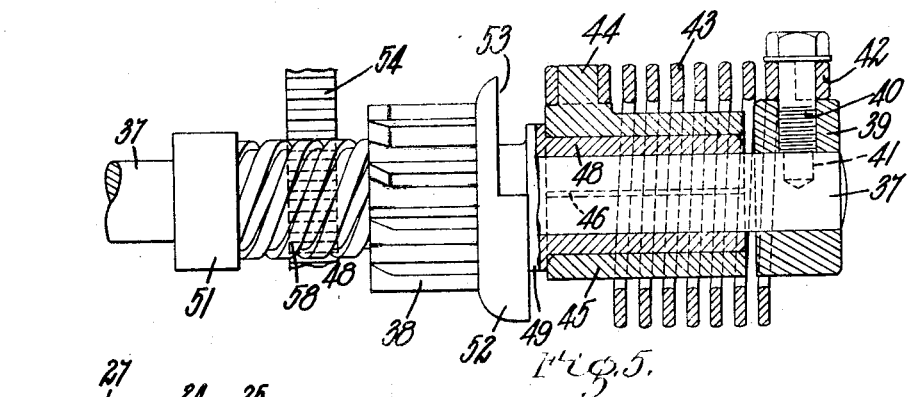
Fig. 5 is a sectional elevation of another embodiment of my invention.
Figures 4, 6:
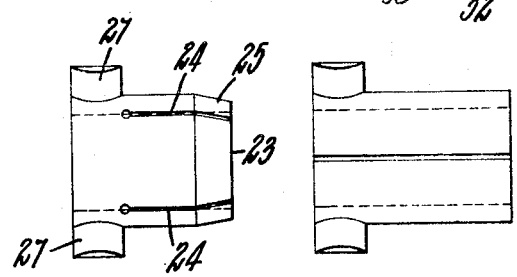
Fig. 4 is a detail side elevation of the split sleeve of the clutch.
Fig. 6 is a detail elevation of a split sleeve.

In Fig. 5 a modified form of this invention is illustrated in which 37 is the driving shaft, 38 the pinion and 39 is a collar which is fastened to the shaft 37 by a stud 40 having screw-threaded engagement therewith and projecting at 41 into the shaft 37. The stud 40 projects outwardly from the collar 39 and has attached thereto one end 42 of a torsional spring 43. The other end of said spring 43 is attached to an ear 44 on a split sleeve 45. The sleeve 45 is provided with a slit 46 extending longitudinally thereof and the said sleeve 45 surrounds and has frictional engagement with a sleeve 48 which has a flange 49 thereon and projects through the pinion 38. The sleeve 48 has a screw thread 50 upon its periphery which has screw-threaded engagement with the bore of the pinion 38 and the sleeve 48 is loosely mounted upon the shaft 37 which rotates therewithin. A collar 51 fast to the sleeve 48 limits the movement of the pinion 38 toward the left Fig. 5. The pinion 38 is provided with a flange 52 which is recessed at 53, so that the pinion 38 is thus provided with a counterbalance.

The general operation of the modified form of my invention illustrated in Fig. 5 is as follows:—The shaft 37 is rotated by the self-starter motor, thus rotating the collar 39 and through the stud 40 and torsional spring 43 the split sleeve 45 will be rotated, and having frictional engagement with the clutch sleeve 48 said clutch sleeve will also be rotated, thus rotating the screw thread 50 and moving the pinion 38 longitudinally of the shaft 37 into engagement with the teeth of the gear 54. The operation of the device is then very similar to the operation of the device illustrated in Figs. 1 to 4 inclusive, the pinion being rotated through a friction clutch and torsional spring, the friction clutch slipping before the strain on the torsional spring will break the same. Both forms, however, are alike in that there is embodied in each of said devices a driving shaft, a driven member embodying a gear, a pinion slidable longitudinally of or in relation to said shaft into engagement with said gear, a frictional clutch on the shaft, a torsional spring surrounding the shaft, and means actuated by the rotation of the shaft and including said friction clutch and torsional spring for sliding the pinion longitudinally of the shaft and into engagement with the gear when, upon encountering abnormal resistance, the torsional spring will yield and before the torsional spring has been subjected to sufficient strain to break it, the clutch will slip.

I claim:—

1. An engine starter comprising, in combination with a driven member operatively connected at all times with the engine, a motor, a driving member operated thereby and adapted to co-operate with and drive the driven member but normally out of engagement therewith, means whereby relative movement between the motor and the driving member automatically moves the latter into driving engagement with the driven member, and a yielding driving connection embodying a torsional spring and a constant torque radially operated friction clutch having co-operating friction surfaces extending parallel to the axis thereof and co-operating directly with said driving member to drive said driven member.

2. An engine starter comprising, in combination with a driven member operatively connected at all times with the engine, a motor, a driving member operated thereby and adapted to co-operate with and drive the driven member but normally out of engagement therewith, means whereby relative movement between the motor and the driving member automatically moves the latter into driving engagement with the driven member, and a friction clutch embodying therein cylindrical friction surfaces extending parallel to the axis thereof and a torsional spring interposed between the motor and said driving member and co-acting therewith to drive said driven member, the capacity of said clutch being less than the shock torque of the motor.

3. An engine starter comprising a motor, a rotatable shaft driven thereby, a driving member mounted to travel longitudinally on said rotatable shaft and also to rotate therewith, and a yielding driving connection embodying a torsional spring and a radially operated friction clutch between said shaft and driving member, said clutch embodying therein cylindrical gripping surfaces extending parallel to the axis thereof.

4. An engine starter comprising a motor, a rotatable shaft driven thereby, a driving member mounted to travel longitudinally on said rotatable shaft and also to rotate therewith, and a spring driving connection embodying a torsional spring and a friction clutch between said shaft and driving member, said clutch embodying therein co-operating friction surfaces extending parallel to the axis thereof.

5. An engine starter comprising a rotatable screw shaft, a driving member having screw-threaded connection therewith and loosely mounted for longitudinal movement thereon for rotary movement therewith, and a yielding driving connection embodying a torsional spring and a friction clutch of constant torque capacity between the driving member and the shaft, said clutch embodying therein co-operating gripping surfaces extending parallel to the axis thereof.

6. An engine starter comprising a rotatable screw shaft, a pinion loosely mounted for longitudinal movement thereon and for rotary movement therewith, and a yielding driving connection embodying a torsional spring and a radially operated friction clutch between the pinion and shaft, said clutch embodying therein co-operating gripping surfaces extending parallel to the axis thereof.

7. An engine starter comprising a motor, a rotatable shaft driven thereby, a driving member mounted to travel longitudinally on said rotatable shaft, and also to rotate therewith, said member being weighted to compel said longitudinal movement, and a yielding driving connection embodying a torsional spring and a radially operated friction clutch embodying therein superposed cylindrical friction surfaces extending parallel to the axis thereof and between said shaft and driving member.

8. An engine drive mechanism having, in combination, a driving shaft, a driven member embodying a gear, a pinion slidable longitudinally of said shaft into engagement with said gear, a friction clutch on said shaft embodying therein co-operating gripping surfaces extending parallel to the axis thereof, a torsional spring surrounding said shaft, and means actuated by the rotation of said shaft and including said clutch and torsional spring, for sliding said pinion longitudinally of said shaft and into engagement with said gear.

9. An engine drive mechanism having, in combination, a driving shaft, a driven member embodying a gear, a pinion slidable longitudinally of said shaft into engagement with said gear, a clutch on said shaft embodying therein co-operating cylindrical gripping surfaces extending parallel to the axis thereof, a torsonal spring surrounding said shaft, one end thereof being fastened to said pinion, and means actuated by the rotation of said shaft and including said clutch and torsional spring, for sliding said pinion longitudinally of said shaft and into engagement with said gear.

10. An engine drive mechanism having, in combination, a driving shaft, a driven member embodying a gear, a pinion slidable longitudinally of said shaft into engagement with said gear, a radially operated clutch on said shaft embodying therein superposed friction surfaces extending parallel to the axis thereof, a sleeve slidable on said shaft, a torsional spring interposed between said sleeve and pinion, and means actuated by the rotation of said shaft and including said clutch, sleeve and torsional spring for sliding said pinion longitudinally of said shaft and into engagement with said gear.

11. An engine drive mechanism having, in combination, a driving shaft, a driven member embodying a gear, a pinion slidable longitudinally of said shaft into engagement with said gear, a clutch on said shaft embodying therein co-operating friction surfaces extending parallel to the axis thereof, a cam sleeve slidable on said shaft, a torsional spring interposed between said sleeve and pinion, one end thereof being fast to said cam sleeve and the other to said pinion, and constituting the only means whereby said pinion may be rotated by said cam sleeve, and means actuated by the rotation of said shaft and including said clutch, sleeve and torsional spring for sliding said pinion longitudinally of said shaft and into engagement with said gear.

12. An engine drive mechanism having, in combination, a driving shaft, a driven member embodying a gear, a pinion slidable longitudinally of said shaft into engagement with said gear, a radially operated clutch on said shaft, a sleeve slidable on said shaft, a torsional spring interposed between said sleeve and pinion, one end thereof being fast to said sleeve and the other to said pinion and constituting the only means whereby said pinion may be rotated by said sleeve, and a lateral projection on said clutch engaging a cam surface on said sleeve, whereby said pinion may be slid along said shaft and into engagement with said gear.

13. An engine drive mechanism having, in combination, a driving shaft, a driven member embodying a gear, a pinion slidable longitudinally on said shaft into engagement with said gear, a radially operated friction clutch on said shaft comprising a clutch sleeve fast to said shaft and a split sleeve surrounding said clutch sleeve and clutched thereto by frictional engagement, a cam sleeve slidable on said shaft, a torsional spring interposed between said slidable cam sleeve and pinion, one end thereof being fast to said cam sleeve and the other to said pinion and constituting the only means whereby said pinion may be rotated by said cam sleeve, and means actuated by the rotation of said shaft and including said clutch, slidable cam sleeve and torsional spring, for sliding said pinion longitudinally of said shaft and into engagement with said gear.

14. An engine drive mechanism having, in combination, a driving shaft, a driven member embodying a gear, a pinion slidable longitudinally on said shaft into engagement with said gear, a friction clutch on said shaft comprising a clutch sleeve fast to said shaft and a split sleeve surrounding said clutch sleeve and clutched thereto by frictional engagement, a sleeve slidable on said shaft, a torsional spring interposed between said slidable sleeve and pinion, a lateral projection on said split sleeve engaging a cam surface on said slidable sleeve, whereby said pinion may be slid along said shaft and into engagement with said gear.

15. An engine drive mechanism having, in combination, a driving shaft, a driven member embodying a gear, a pinion slidable longitudinally on said shaft into engagement with said gear, a friction clutch on said shaft comprising a clutch sleeve fast to said shaft and a split sleeve surrounding said clutch sleeve and clutched thereto by frictional engagement, a sleeve slidable on said shaft, a torsional spring interposed between said slidable sleeve and pinion, a lateral projection on said split sleeve engaging a cam surface on said slidable sleeve, whereby said pinion may be slid along said shaft and into engagement with said gear, and means to increase the pressure of the split sleeve against said clutch sleeve when the pinion engages the gear.

16. An engine drive mechanism having, in combination, a driving shaft, a driven member embodying a gear, a pinion slidable longitudinally on said shaft into engagement with said gear, a friction clutch on said shaft comprising a clutch sleeve fast to said shaft and a split sleeve surrounding said clutch sleeve and clutched thereto by frictional engagement, said split sleeve being tapered at one end to engage a tapered surface on said clutch sleeve, a sleeve slidable on said shaft, a torsional spring interposed between said slidable sleeve and pinion, and means actuated by the rotation of said shaft and including said clutch, slidable sleeve and torsional spring, for sliding said pinion longitudinally of said shaft and into engagement with said gear, whereby the pressure of said split sleeve against the clutch sleeve when the pinion engages the gear may be increased.

17. An engine drive mechanism having, in combination, a driving shaft, a driven member embodying a gear, a pinion slidable longitudinally of said shaft into engagement with said gear, a clutch on said shaft embodying therein co-operating friction surfaces extending parallel to the axis thereof, a torsional spring surrounding said shaft, one end thereof being fastened to said pinion, and the other end to said clutch and constituting the only means whereby said pinion may be rotated by said clutch, and means actuated by the rotation of said shaft and including said clutch and torsional spring, for sliding said pinion longitudinally of said shaft and into engagement with said gear and for rotating said pinion.

18. An engine drive mechanism having, in combination, a driving shaft, a driven member embodying a gear, a pinion slidable longitudinally of said shaft into engagement with said gear, a clutch on said shaft of constant torque capacity and embodying therein co-operating friction surfaces extending parallel to the axis thereof, a cam sleeve slidable on said shaft, a torsional spring interposed between said cam sleeve and pinion, a torsional spring interposed between said sleeve and pinion, one end thereof being fast to said cam sleeve and the other to said pinion and constituting the only means whereby said pinion may be rotated by said cam sleeve, and means actuated by the rotation of said shaft and including said clutch, cam sleeve and torsional spring for sliding said pinion longitudinally of said shaft and into engagement with said gear and for rotating said pinion.

19. An engine drive mechanism having, in combination, a driving shaft, a driven member embodying a gear, a pinion slidable longitudinally of said shaft into engagement with said gear, a clutch on said shaft embodying therein cylindrical friction surfaces extending parallel to the axis thereof, a cam sleeve slidable on said shaft, a torsional spring interposed between said cam sleeve and pinion, one end thereof being fast to said cam sleeve and the other to said pinion, a torsional spring interposed between said sleeve and pinion, one end thereof being fast to said cam sleeve and the other to said pinion and constituting the only means whereby said pinion may be rotated by said cam sleeve, and means actuated by the rotation of said shaft and including said clutch, cam sleeve and torsional spring for sliding said pinion longitudinally of said shaft and into engagement with said gear, and for rotating said pinion.

20. An engine drive mechanism having in combination, a driving shaft, a driven member embodying a gear, a pinion slidable longitudinally of said shaft into engagement with said gear, a clutch on said shaft, a sleeve slidable on said shaft, a torsional spring interposed between said sleeve and pinion, and a lateral projection on said clutch engaging a cam surface on said sleeve, whereby said pinion may be slid along said shaft and into engagement with said gear and said pinion and gear rotated.

21. An engine drive mechanism having, in combination, a driving shaft, a driven member embodying a gear, a pinion slidable longitudinally on said shaft into engagement with said gear, a radially operated friction clutch on said shaft comprising a clutch sleeve fast to said shaft and a split sleeve surrounding said clutch sleeve and clutched thereto by frictional engagement, a cam sleeve slidable on said shaft, a torsional spring interposed between said slidable cam sleeve and pinion, one end thereof being fastened to said pinion and the other to said cam sleeve and constituting the only means whereby said pinion may be rotated by said cam sleeve, and means actuated by the rotation of said shaft and including said clutch, slidable cam sleeve and torsional spring, for sliding said pinion longitudinally of said shaft and into engagement with said gear and for rotating said slidable sleeve, torsional spring, pinion and gear.

22. An engine drive mechanism having, in combination, a driving shaft, a driven member embodying a gear, a pinion slidable longitudinally on said shaft into engagement with said gear, a friction clutch on said shaft comprising a clutch sleeve fast to said shaft and a split sleeve surrounding said clutch sleeve and clutched thereto by frictional engagement, a sleeve slidable on said shaft, a torsional spring interposed between said slidable sleeve and pinion, and a lateral projection on said split sleeve engaging a cam surface on said slidable sleeve, whereby said pinion may be slid along said shaft and into engagement with said gear and said pinion and gear rotated.

23. A friction clutch having, in combination, a rotary shaft, a clutch sleeve fast thereto, a sleeve surrounding said clutch sleeve and split longitudinally thereof for a portion of its length, the split end portion of said split sleeve being bevelled and projecting into an annular recess in said clutch sleeve with its bevel contacting with a wall of said recess, and means to push said bevelled end into said recess, whereby the frictional clutching engagement of said split sleeve with said clutch sleeve will be increased.

24. A friction clutch having, in combination, a rotary shaft, a clutch sleeve fast thereto, a sleeve surrounding said clutch sleeve and split longitudinally thereof for a portion of its length, the outer end of said split sleeve being bevelled and projecting into an annular recess with a bevelled side wall in said clutch sleeve, the bevelled end of said split sleeve contacting with said bevelled wall, said split sleeve and clutch sleeve being normally clutched together by frictional engagement of predetermined capacity, and means to force said bevelled end into said recess, whereby the frictional capacity of the split portion of said split sleeve against said clutch sleeve may be increased.

25. An engine drive mechanism having, in combination, a driving shaft, a driven member embodying a gear, a pinion slidable longitudinally of said shaft into engagement with said gear, a clutch sleeve loose on said shaft projecting through said pinion and having screw-threaded engagement therewith, a split sleeve on said clutch sleeve having frictional engagement therewith, said clutch sleeve and split sleeve constituting a friction clutch, and a torsional spring connected at one end to said split sleeve and at the other end to said shaft.

26. An engine drive mechanism having, in combination, a driving shaft, a lateral projection on said shaft, a driven member embodying a gear, a pinion slidable longitudinally of said shaft into engagement with said gear, a clutch sleeve loose on said shaft projecting through said pinion and having screw-threaded engagement therewith, a split sleeve on said clutch sleeve having frictional engagement therewith, said clutch sleeve and split sleeve constituting a friction clutch, a lateral projection on said split sleeve, and a torsional spring connected at one end to the lateral projection on said shaft and at the other end to the lateral projection on said split sleeve.

27. An engine starter comprising, in combination, a driven member, a motor, a driving member operated thereby and adapted to co-operate with and drive the driven member but normally out of engagement therewith, means to move the driving member into driving engagement with the driven member, and a driving connection embodying a friction clutch of constant torque capacity substantially equal to the stall torque of the motor and adapted to slip at each start of said motor, and a spring interposed between the motor and the driving member and co-operating with the clutch to form a shock absorber.

28. An engine starter comprising, in combination, a driven member, a motor, a driving member operated thereby and adapted to co-operate with and drive the driven member but normally out of engagement therewith, means to move the driving member into driving engagement with the driven member, and a driving connection embodying a spring constituting a buffer and adapted to allow axial motion to absorb shocks, and a friction clutch interposed between the motor and the driving member and coacting therewith to drive said driven member and also slip at each interengagement of the driving and driven members, said clutch having torque capacity substantially equal to the stall torque of the motor.

29. An engine starter comprising, in combination, a driven member, a motor, a driving member operated thereby and adapted to co-operate with and drive the driven member but normally out of engagement therewith, means to move the driving member into driving engagement with the driven member, a yielding driving connection embodying a friction clutch having cylindrical gripping surfaces adapted to slip at each start of the motor, and a coil spring interposed between the motor and the driving member and co-operating therewith to drive said driven member.

30. An engine starter comprising, in combination, a driven member, a motor, a driving member operated thereby and adapted to co-operate with and drive the driven member but normally out of engagement therewith, means to move the driving member into driving engagement with the driven member, and a driving connection embodying a friction clutch of constant torque capacity substantially equal to the stall torque of the motor and adapted to slip at each start of said motor.

ROLLIN ABELL.